(12) United States Patent
Clark et al.

(10) Patent No.: US 7,444,355 B1
(45) Date of Patent: Oct. 28, 2008

(54) SYSTEM AND METHOD FOR ASSIGNING MANAGEMENT RESPONSIBILITY FOR MANAGEABLE ENTITIES

(75) Inventors: Paul Clark, Boxboro, MA (US); Svetlana Patsenker, Wayland, MA (US); Thomas Demay, Ashburn, VA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 881 days.

(21) Appl. No.: 10/675,281

(22) Filed: Sep. 30, 2003

(51) Int. Cl.
*G06F 17/00* (2006.01)
*G06F 7/00* (2006.01)

(52) U.S. Cl. .................. 707/104.1; 707/1; 707/3; 707/10; 707/100; 707/102

(58) Field of Classification Search .............. 707/1–3, 707/10, 9, 100–102, 104.1
See application file for complete search history.

(56) References Cited

U.S. PATENT DOCUMENTS

| | | | |
|---|---|---|---|
| 5,802,146 A * | 9/1998 | Dulman | 379/32.03 |
| 6,581,094 B1 * | 6/2003 | Gao | 709/220 |
| 2003/0154271 A1 * | 8/2003 | Baldwin et al. | 709/223 |
| 2004/0030768 A1 * | 2/2004 | Krishnamoorthy et al. | 709/223 |
| 2004/0098584 A1 * | 5/2004 | Sherman et al. | 713/168 |

* cited by examiner

*Primary Examiner*—John Cottingham
*Assistant Examiner*—Susan F Rayyan
(74) *Attorney, Agent, or Firm*—Chapin IP Law, LLC; Barry W. Chapin, Esq.

(57) ABSTRACT

Storage Area Network (storage area network) management employs agents, each under the control of a common server. Determination and assignment of available agents to candidate manageable entities suffers from several deficiencies. Distributed access control information may be security sensitive. Distribution of the access data across the local storage at the manageable entities is cumbersome to track and manage. Embodiments of the invention provide assignment of agents to manageable entities from a central repository, therefore avoiding distributed sensitive information. Depending upon the type of managed entity the agent is adapted to manage, the server retrieves access data from the repository, rather than from a local initialization (.ini) file. Each agent determines which storage elements it can manage. The server correlates the information sent by each agent for each configured managed entity to generate a management correlation. The server then determines a primary agent responsible for managing each of the manageable entities.

30 Claims, 11 Drawing Sheets

SYSTEM AND METHOD FOR ASSIGNING MANAGEMENT RESPONSIBILITY FOR MANAGEABLE ENTITIES

BACKGROUND OF THE INVENTION

Conventional Storage Area Networks (storage area networks) interconnect storage are network devices, such as data storage systems having many disk drives and related storage connection peripherals (e.g., tapes drives or other backup devices) to host computer systems or server devices which access (e.g., read, write and serve) the data stored thereby to user computer systems know as clients that operate outside of the storage area network. Such a storage area network environment typically stores large amounts of data redundantly and allows for fast retrieval and updates to such data. In a typical conventional storage area network configuration, control and management of the storage area network devices occurs in a dedicated control center computer system, or storage area network management server, that executes various software components of a storage area network management software application.

The storage area network, therefore, includes a plurality of interconnected storage area network devices, such as disk drive arrays, switches, routers, and host computer systems that collectively operate to retrieve, update, backup, protect and store the data resident in the storage area network. The management server computer system operates the storage area network management software application to allow an administrator (e.g., a person responsible for administering the storage area network) to manage the storage area network devices as a set of manageable entities from a central location. The manageable entities can also include software applications such as database programs, data redundancy applications, backup software programs and so forth, all of which can be remotely monitored, managed and controlled via the storage area network management application.

To allow such remote management capability of manageable entities, a set of agent software programs execute on various devices within the storage area network, such as within host or server computer systems or within certain storage area network devices (e.g., within switches or large data storage systems) deployed within the storage area network. Each agent is designed for specific operation of or management of a particular type or set of manageable entities (MEs) under the control of the management server. As an example, a switch agent may execute on a host (or within a switch itself) within the storage area network to perform management tasks associated with storage area network switches that operate within the storage area network. There may be different switch agents for switches made by different manufacturers. As another example, a database agent may operate on a host in order to perform storage area network management tasks and operations associated database management for a particular vendor database. There may be backup agents, redundancy agents, and generally many other types of agents that collectively operate in conjunction with the storage area network management server application. During operation, the agents receive management commands from the management server application running on the management server that oversees the manageable entities (e.g., storage area network devices) in the storage area network.

During startup of a conventional storage area network management application, the management server software process communicates with the agent software processes in order to assign management responsibility for the various manageable entities to the particular agents. The agents often run on host computers (hosts), each of which typically supports operation of a plurality of agents.

SUMMARY

As noted above, conventional storage area network management techniques employ a plurality of agents, each under the control of a common management server such as a storage area network management control center application. The conventional control center application assigns agents to manage manageable entities in a manner that attempts to distribute the workload across the available agents. A typical conventional technique for agent assignment involves each of the agents reporting potential candidate manageable entities back to the server upon startup of those agents. As an example, upon startup of a database management agent, the database agent may report a listing of each database instance that the agent would be able to manage (i.e., each database instance that the agent can "see") if it were assigned such management responsibility by the management server. The conventional management server processes the information reported from each of the agents, and then determines, either via an automated selection procedure or by manual operator input, which agents are to manage each operating conventional manageable entity.

The agents determine the conventional candidate manageable entities from the set of manageable entities that are "visible" to that agent on the storage area network. In order to identify a manageable entity (to which that agent may be given management responsibility), the agent requires access data to access (e.g., to login to) the manageable entity and determine operating parameters of that entity, such as numbers and types of storage units (disks), ports, cache areas, etc. within the entity. The access data associated with a typical conventional manageable entity is stored within a local initialization file (.ini file) maintained within local storage (e.g., a local disk drive) on a host computer system that executes the conventional agents.

As an example, in order for a switch agent to identify a particular manageable entity such as a storage area network switch, the switch agent typically needs to gain access to the switch via proxy login, for example, to determine operational parameters of the switch. In a conventional configuration, the host computer system upon which the switch agent executes stores this access data in local storage, such as within one or more initialization (".ini") files. In order to obtain the access data, the agent reads the .ini file specific to each applicable manageable entity (e.g., the switch access data .ini file in this example). Therefore, configured host computer systems that operate the agents in conventional storage area network management designs store the corresponding access data in a distributed manner across local storage corresponding to each host. Once the switch agent uses the proper access data from the .ini file to access and therefore identify switches within the storage area network that the agent could potentially manage, the switch agent reports back the list of manageable entities (i.e., those switches it was successfully able to communicate with) to the storage area network management application. The storage area network management application then uses this identified list of manageable entities from agents (i.e., those entities that the agent indicated as being able to gain access to) to perform the task of assigning specific agents the responsibility of managing specific identified manageable entities.

Unfortunately, conventional mechanisms and techniques for determination and assignment of available agents for management of candidate manageable entities suffer from several deficiencies. Such conventional .ini files that hosts store locally for access by agents executing on those hosts typically contain security sensitive access control information enabling access to the manageable entity (e.g., username/password information for a management access interface of a switch). Such access control information or .ini files, and/or other types of access data, are often highly security sensitive and are thus not properly protected in conventional designs. Furthermore, distribution and management of the access data within local storage devices (e.g., local disk drives) at the conventional manageable entities (e.g., within the various hosts that operate agents) becomes quite cumbersome to track, retrieve, update and manage.

As an example, there may be several hosts that each requires individual access data .ini files for the same manageable entities, such that if the same agent program executes on any of these hosts, that agent will have proper access to the required access data. Inconsistency and configuration differences between individual hosts can arise and may result in the inability of an agent to retrieve the proper access data corresponding to multiple manageable entities of different types when required. As a specific example, if a management or administrator login account allowing access to a switch receives a new username or password, the storage area network administrator must manually edit the .ini switch access data file on each host in the storage area network that can execute a switch agent in order to have the access data files on each host reflect the new management account access data. This can be a cumbersome and error prone task.

The present invention substantially overcomes drawbacks associated with conventional mechanisms for distribution and placement of access parameters used by management agents in operation, employed in the assignment of agents to manageable entities. According to a particular configuration, a repository stores access data for gaining access to and discovering parameters about the manageable entities visible from each of the agents. Upon startup of the storage area network management application server and associated agents, the available agents report their availability to the server responsible for assigning agents to manage managed entities. Each host operates (e.g., runs) one or more agents, and each agent has the ability to manage one or more types of managed entity. Managed entity types include, by way of example only, mass storage elements of varying types, software component types, networking (e.g., switching) component types, database component types, and others.

Embodiments of the invention provide assignment of agents to manageable entities by using access data obtained from a central repository. The server can remotely transfer the access data to agents using a unique protocol defined by embodiments of the invention, therefore avoiding creation of distributed .ini files on remote hosts that have sensitive information. Depending upon the type of managed entity the agent is adapted to manage, the server of this invention retrieves access data for attempting access and discovery of the configured managed entities corresponding to the type from the repository, rather than the agent obtaining such data from a local initialization (.ini) file on each host. Each agent uses the access data received form the centralized server and attempts to operate a discovery process to determine, based on a topology configuration of the storage area network and other factors, which storage elements it can manage (i.e. reach via login using the access data). The agents report accessible manageable entities to the server, and the server correlates the information sent by each agent for each configured managed entity to generate a management correlation. The server invokes agent allocation logic with the resulting management correlation to determine (i.e., to assign) a primary agent responsible for managing each of the identified manageable entities.

In further detail, in a particular configuration, the method discussed herein for distributing access data to management agents, for facilitating assigning management responsibility to the agents, for management of manageable entities includes the server retrieving the access data from a repository. Through an exchange of messages, the server and agents employ the access data to enable discovery of manageable entities and determine which agents manage which manageable entities. The access data, such as user account login names, passwords and network addresses (or other device identities), enables an storage area network agent to gain management access (but not perform management at that time) to manageable entities in the storage area network and thus allows the agent to identify that manageable entity as a candidate for management with the storage area network.

In operation, upon activation of the agent, the agent transmits an initialization message to the server that identifies the agent as being of a particular entity type. Upon receipt of the initialization message, the server transmits a discovery message including the access data to the agents, according to a type of the manageable entity or entities associated with (i.e. manageable by) that agent, such as storage elements, network (e.g., switch) elements and database elements and so forth. The discovery message containing the access data for the entity types associated with the agent (e.g., switch access data for a switch agent) allows the agent to attempt to access manageable entities of the type associated with the agent (e.g., allows the switch agent to attempt to login to and connect with any switches that the switch agent can communicate with in the storage area network). Once the agent has attempted to access all manageable entities using the access data received in the discovery message, the switch sends an object list message back to the server. The server receives the object list message from the agents indicative of manageable entities manageable (e.g. network "visible") by the agent based on the access data transmitted to the agent. The server then assigns management responsibility to each of the agents for one or more manageable entities indicated in the object list message.

In alternate configurations, the server, in assigning management responsibility, identifies a set of agents operable (i.e. potentially capable) to manage the manageable entity, and determines, from the identified set of agents, a primary agent operable for managing the manageable entity. The assigning includes selectively transmitting a primary agent message from the server to the agent indicative of responsibility for managing the manageable entity (or entities in a case where that agent is to manage more than one entity). The primary agent message can contain other information that can allow the agent to further operate with that manageable entity, such as to enable the agent to discover storage characteristics of the manageable entity in relation to the storage area network environment. Only one primary agent from among the available set is typically employed to manage each manageable entity.

In particular implementations, the manageable entities previously stored the access data in local files. Accordingly, prior to retrieving the access data, the agent migrates the access data to a repository. The repository is a secure repository in which access data is omitted from a local datastore corresponding to the agents.

The servers determine, from the access data, information for enabling discovery of the known managed objects corresponding to the accessible manageable entities and build the discovery message from the access data. The access data may take several forms, depending on the type of manageable entity to which it corresponds, and includes access control information operable to permit (or deny) access based on the information in the access control information. The access data may also include identification information operable for identifying manageable entities in communication with the agent, and the determination of the primary agent includes enabling the agent for discoverable access to the manageable entity. The access data may therefore be an enumeration of discoverable parameters, including at least one of passwords, network address, third party software paths, and control parameters.

The servers obfuscate or encrypt the access data in the discovery message, the obfuscating operable to deter unintended determination of the access data for security purposes.

The message exchange between the agent and server includes, prior to retrieving the access data, receiving an initialization message from at least one of the agents, the initialization message indicative of the readiness of the agent and a type of manageable entity which the agent is operable to manage. The server, in response to the initialization message, queries a component table of the repository to determine configured manageable entities corresponding to the type of manageable entities which the agent is operable to manage.

In particular arrangements, retrieving from the repository includes, for each of the configured manageable entities: indexing, via the identity of the configured manageable entity, into a manageable entity parameter store, retrieving the access data corresponding to the type of the manageable entity; and generating the discovery message from the retrieved access data. Accordingly, each manageable entity operable for assisted discovery as defined herein has a corresponding entry in the repository.

In particular arrangements, the message exchange includes an object list message identifying, for each of the configured manageable entity types for which access data was found, an indicator of each of the agents operable to manage the type of configured manageable entity. The server aggregates information from the object list and the retrieved access data to generate a management correlation indicative of the each of the agents operable to manage each of the configured manageable entity. The server processes the management correlation, according to agent allocation logic, to select a particular agent as the primary agent for each of the configured manageable entities.

In the event of an unavailable or new agent or manageable entity, the server reassigns management responsibility accordingly. Particular arrangements include receiving an indication of an unavailable agent and reprocessing the management correlation to identify the managed entities managed by the unavailable agent. The server reapplies the agent allocation logic to select another agent as the primary agent for the identified managed entities.

In the event of addition of a managed entity, the server receives, from a user via a console GUI application, an indication of an additional access data parameter for a type of managed entity. The server adds the access data corresponding to the augmented manageable entity data to the repository, and sends discovery messages corresponding to the added manageable entity parameter to each of the agents operable to manage (i.e. of the corresponding type) the added manageable entity. The server then receives the object list corresponding to the sent discovery message, adds the newly added manageable entity to the management correlation, and reprocessing the management correlation, according to agent allocation logic, to integrate the additional access data parameter and startup propagation to the affected agents.

The invention as disclosed above is described as implemented on a computer having a processor, memory, and interface operable for performing the steps and methods for assigning management responsibilities for storage area network entities as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a control center process or processes that causes the computerized device to perform any and/or all of the method embodiments, steps and operations explained herein as embodiments of the invention to allow execution of instructions in a computer program such as a Java application. In other words, a computer, processor or other electronic device that is programmed to operate embodiments of the invention as explained herein is itself considered an embodiment of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides the associated processing operations as explained herein or either or both of the agent and/or storage area network management application. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers can also provide the system of the invention.

It is to be understood that the system of the invention can be embodied strictly as a software program, as software and hardware, or as hardware alone. Example embodiments of the invention may be implemented within EMC's Control Center software application that provides management functionality for storage area network manageable entities and in computerized devices that operate the Control Center software. It is to be understood that Control Center is one example implementation and is not intended to limit to scope of embodiments of this invention in any manner. As such, embodiments of the invention may include more or less of the features from Control Center. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
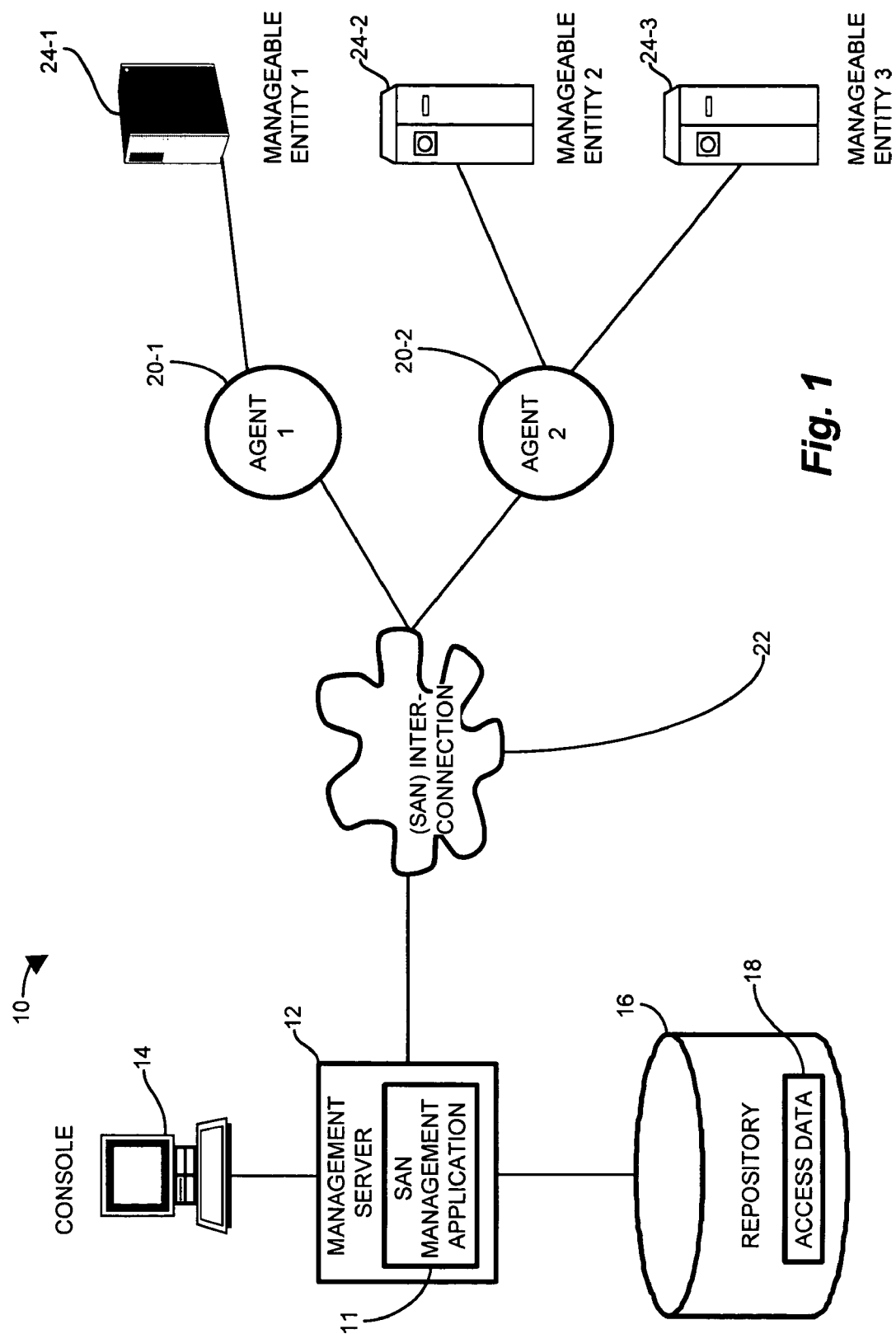
FIG. 1 is a block diagram of a storage area network (storage area network) suitable for use with the present invention.

FIG. 1 is a block diagram of a storage area network (storage area network) 10 suitable for use in explaining operation of embodiments of the present invention. FIG. 1 will be used to present a high level overview of the system of the invention in conjunction with a flow chart of processing steps in FIG. 2. More detailed system design diagrams and flow charts will follow this discussion thereafter.

Referring to FIG. 1, the storage area network 10 includes a management server 12, a console 14, a repository 16 containing (i.e., storing) access data 18, and a storage area network interconnection fabric 22, or data communication network, such as a LAN or network backbone. The storage area network also includes one or more agents 20-1, 20-2 (20, generally) that execute in this example on a plurality of host computer systems 28 (28-1, 28-2 in this example). Each host couples to a plurality of managed entities 24-1-24-3 (24, generally). Note that some manageable entities 24 coupled to the storage area network interconnection 22, while others are directly attached to hosts 28.

The management server 12 (referred to generally herein as server) is responsive to the console 14 and includes a SAN management application 11 for issuing user storage area network management commands between a storage area network operator and the storage area network elements (20, 24, and others not specifically shown). The management server 12 also connects to the repository 16, and to the storage area network interconnection 22. The storage area network interconnection 22 provides communication to the agents 20, which are in turn connected to the manageable entities 24. Each agent 20 manages (i.e. is responsible for) one or more manageable entities 24.

In operation to manage entities 24 within the storage area network 10, the agents 20 are responsive to the management server 12 and receive management commands from the console 14 via the interconnection 22. The management server 12 accesses, inter alia, access data 18 from the repository 16. For example, a user may enter a query at the console 14 regarding the state and usage of storage device manageable entities (i.e. disk drive arrays) pertaining to a particular agent 20. The management server 12 receives the query, interrogates the repository 16 to determine how to access the agent 20, and receives the corresponding data. The management server 12 then accesses the agent 20 and issues a request, via the interconnection 22. The accessed agent 20 retrieves information about the manageable entities 24 it is in communication with, and returns the response to the management server 12. Embodiments of the invention are directed to technology for assigning management responsibility between agents 20 and associated manageable entities 24.

Figure 2:
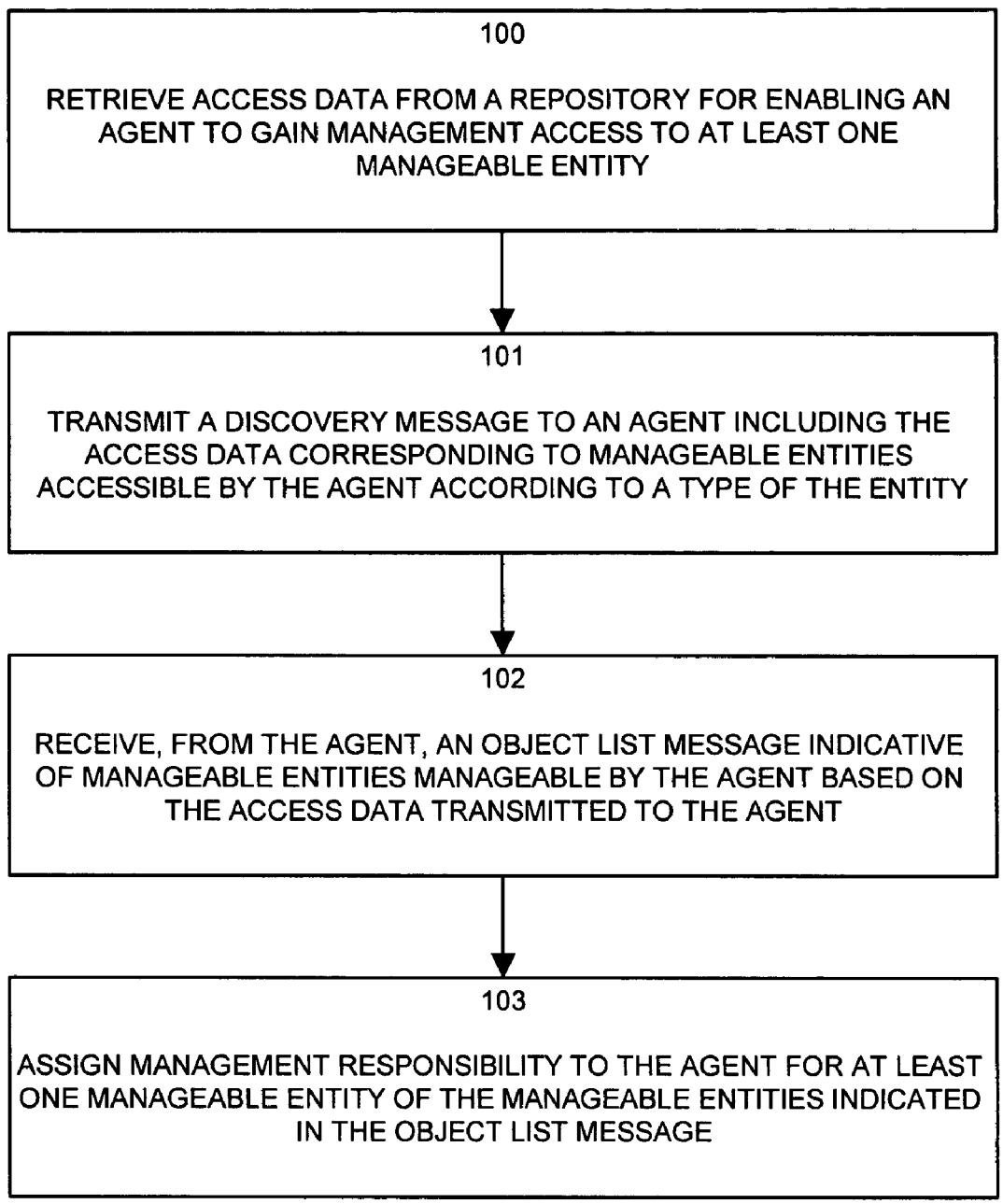
FIG. 2 is a flowchart of assigning agents for management responsibility of managed entities in a storage area network as defined herein.

FIG. 2 is a flowchart of processing steps involved, according to one example embodiment of the invention, for assigning management responsibility of managed entities in the storage area network of FIG. 1 to agents 20. Referring to FIGS. 1 and 2, upon startup of an agent 20, the agent 20 transmits an initialization message to the management server numeral 12 identifying the agent 20 to the management server 12. At step 100, in response to this initialization message, the management server 12 retrieves access data 18 from a repository for enabling the agent 20 to gain management access to the manageable entities 24. The access data is at least an indication of the type of manageable entities in the storage area network of the type corresponding to the agent (i.e., match based on the identification of the agent). For example, a particular agent 20 may be operable to manage a Symmetrix type storage array of disks. The access data 18 indicates, in this instance, the Symmetrix type manageable entities currently configured in the storage area network. The access data may also include, as described further below, access control information such as administrator usernames or accounts, passwords, network addresses, and other parameters that the agent 20 can use to connect with storage systems of the type manageable by that agent 20.

At step 101, the management server 12 transmits a discovery message to an agent 20 including the access data 18 corresponding to the manageable entity or entities of the type manageable by that agent 20. Typically the management server 12 transmits the discovery message to the agent 20, for each manageable entity type for which access data 18 was found, also described further below. The agent 20, therefore, is generally operable to manage a particular type of manageable entity 24 (i.e. Symmetrix, Celerra, etc.). However, alternate configurations may employ multiple agents 20 managing multiple types of manageable entities 24 or a single agent that can manage many different types of manageable entities. The agent 20 receives the discovery message containing the access data 18 and attempts to connect with (e.g., login to) each manageable entity 24 that that agent 20 can "see" within the storage area network 10. During this process, as will be explained further, the agent 20 keeps track of which manageable entities 24 the agent was able to successfully connect to and records this information to transmission as an object list message back to the management server 12.

At step 102, the management server 12 receives the object list message from the agent 20 indicative of manageable entities 24 manageable by the agent 20. The agent 20 generates the object list message based on the access data 18 transmitted to the agent 20, and determines from among the manageable entities 24 in the storage area network 10, which ones the agent 20 may be called upon to manage, depending primarily on the visibility (i.e. connectivity and accessibility) of that agent to that management entity within the storage area network 10 and the type of the manageable entity 24. Therefore, in a particular arrangement, the access data 18 "tells" the agent 20 all the manageable entities 24 in the storage area network 10 of the type it may manage. The agent 20 then attempts to connect with all of the manageable entities of that type using the access data received in the discovery message and responds back to the server 12 with an object list indicating which of those manageable entities 24 it "sees" (i.e. may connect to) in the storage area network 10.

At step 103, based upon the object list message from the agent 20, the management server 12 assigns management responsibility to the agent 20 for one or more manageable entities 24. Generally, the management server 12 computes an aggregation of all the agents 20 and the manageable entities 24 which each may manage (i.e., assuming other agents are operating in the storage area network and that may managed entities of a similar type). The server then applies agent allocation logic, described further below, to determine a primary agent 20 for management responsibility of each of the manageable entities 24.

Embodiments of the invention thus define, in part, a protocol that takes place upon startup of an agent to allow that agent to receive access data from the server for access to manageable entities within the storage area network. The agents 20 report their type to the server 12 and the server 12 provides the proper access data records 18 for each type of manageable entity within the storage area network that the agent might be able to access (based on that agents type). The agents 20 then attempt to access each entity 24 using the access data records 16 and the agents 20 keep track of which entities 24 were successfully accessed using which access data records 16 and report this information back to the server 12. In on configuration, the agents 20 cache the access data records 16 after reporting back to the server in case that agent is assigned management responsibility to a particular managed entity for which that agent 20 was successful in using that access data to gain access. Alternatively, the agent primary message sent by the server 12 can include the particular access data record(s) 16 that the agent 20 is to use for performing management responsibility to assigned manageable entities 24. As will be explained, the server 12 keeps a component or configuration table (not shown in FIG. 1) in the repository 16 such as a matrix that indicates which agents 20 were able to access which manageable entities 24 using which access data records 18. The server can use this collected information from all agents to make a decision as the assignment of management responsibility to specific agents for certain manageable entities. The server then sends a primary agent message to an agent containing a list of those entities that the agent is to manage.

Other features of the invention to be explained in more detail include the ability to have a storage area network administrator add additional access data records 18 to the repository 16 (e.g., after the above processing is complete) for either new manageable entities 24 or for a change in access data for existing managed entities 24. The storage area network management application 11 can detect this change to the access data 18 and can use messages defined by the protocol of this invention to send this new access data to the currently operating agents 20 that correspond to the type of manageable entity to which this new access data applies. Those agents can then use this new access data to attempt to contact manageable entities and can again report back their success or failure in using that access data to communicate with manageable entities. The server 12 can track this information for use in making agent/entity management assignments. It is to be understood that the aforementioned processing and discussion is high-level in nature and that other embodiments of the invention explained below provide additional details concerning refinements and/or alternatives to this general operation.

Figure 3:
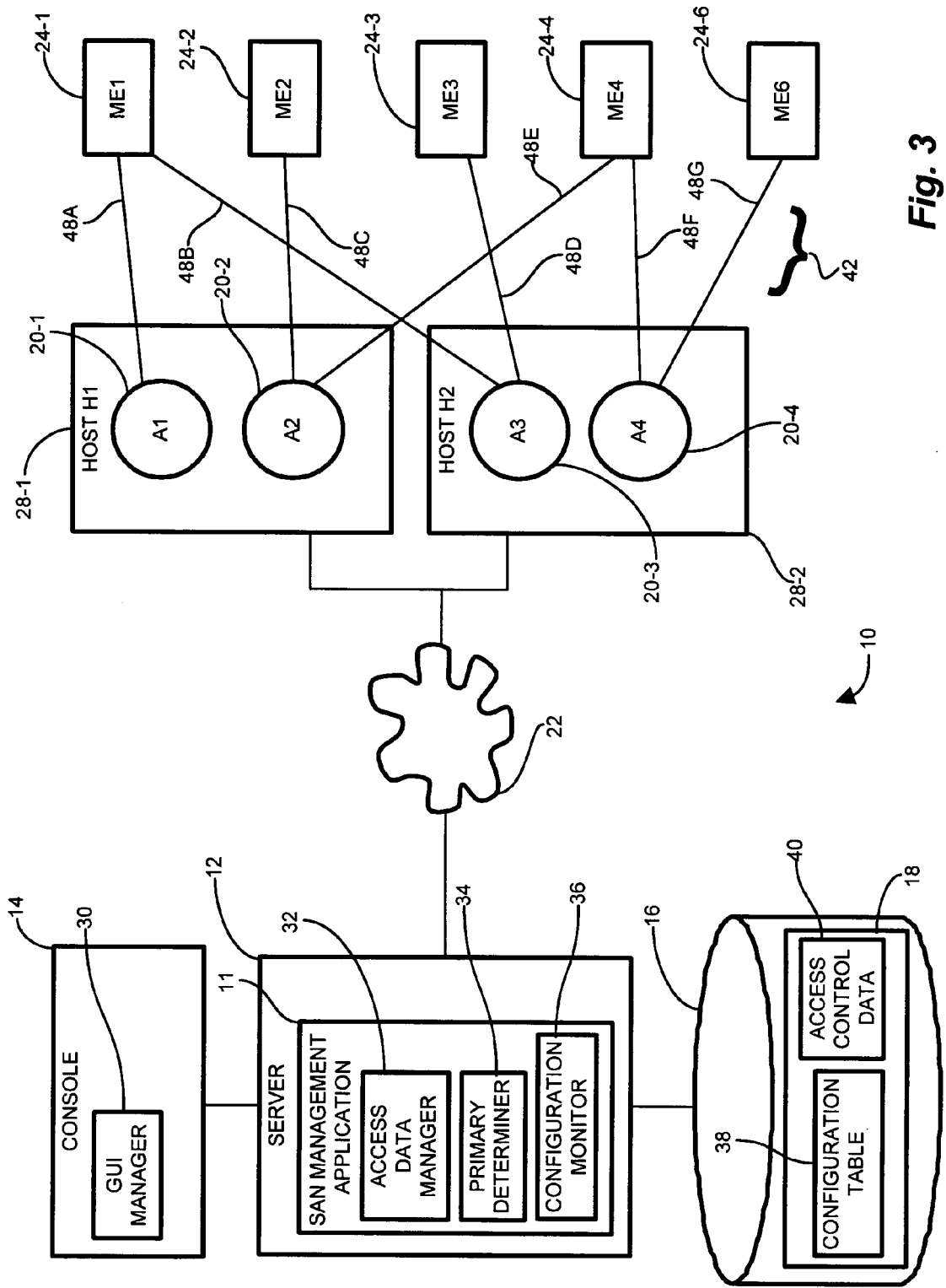
FIG. 3 is a block diagram of the storage area network of FIG. 1 in greater detail.

FIG. 3 is a block diagram of the storage area network of FIG. 1 in greater detail. Referring to FIG. 3, the console 14 includes a GUI manager application 30 for receiving user or operator commands and interfacing with a user. The management server 12 executes, or performs, the SAN management application 11, and includes an access data manager 32, a primary determiner 34, and a configuration monitor 36. The console 14 and management server 12 aggregately form a control center application for the storage area network 10 as a whole, such as the EMC Control Center application (ECC), also marketed commercially by EMC corporation of Hopkinton, Mass., assignee of the present application.

The access data 18 in the repository 16 further includes a configuration table 38 and an access control data table 40. The agents 20-1-20-4 run, or perform, on hosts 28-1 and 28-2 (28 generally), shown as agents A1 and A2 on host H1 and agents A3 and A4 on host H2. Exemplary managed entities (ME) 24-1-24-6 are shown as ME1-ME6 managed by a respective agent 20. Typically the hosts 28 are PCs, workstations, or other server computers operable to run a plurality of agents 20.

Consistent with FIG. 1 above, the management server 12 employs the access data manager 32, primary determiner 34 and configuration manager 36 components within the storage area network management application 11 to perform the invention as explained herein. The access data manger 32 is operable to communicate with the access control data table 40. The configuration monitor 36 monitors addition and deletion of manageable entities 24 in the SAM, similar to a Simple Network Manager Protocol (SNMP) implementation, and communicates with the configuration table 38.

In operation, each of the agents 20 manages one or more manageable entities 24, via a management assignment, as shown by associations 42. In response to a startup, as described above in FIG. 2, or a dynamic network change, described below, the management server 12 determines the management relations from the associations via the primary determiner 34, as will be described shortly with respect to FIGS. 6, 7, and 8. The server invokes the access data manager 32 to reference the configuration table 38 and the access control table 40 for determining the management assignments. The management server 12 determined and communicates the management assignments via a series of messages, described below with respect to FIG. 5, to each agent 20 that it is the primary agent 20 for a particular manageable entity 24.

Figure 4:
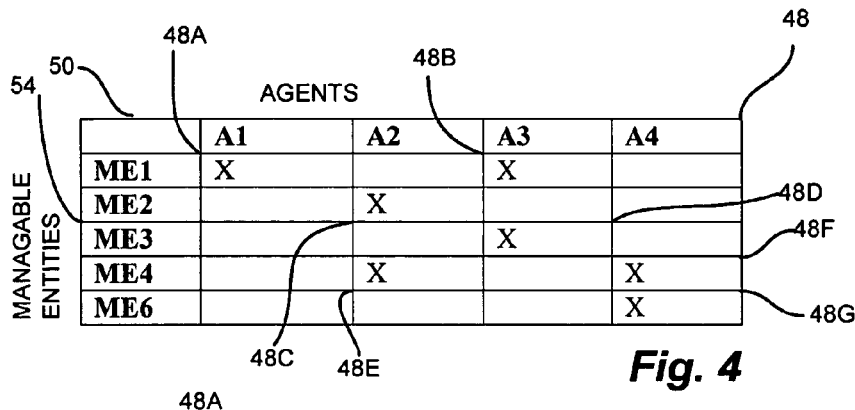
FIG. 4 is a management correlation used for assigning management responsibility in the storage area network of FIG. 3.

FIG. 4 is a management correlation used for assigning management responsibility in the storage area network of FIG. 3. Referring to FIGS. 3 and 4, as described above with respect to FIG. 2, the management server 12 employs agent allocation logic in the primary determination 34 to assign management responsibility. The management server 12 aggregates all the object list messages that were/are sent by the agents 20 to build a management correlation 48. The management correlation 48 indicates which agents 20 may manage a particular manageable entity 24. The correlation 48 identifies the management associations 48a-48f as entries in the management correlation 48 table. The correlation 48 has an agent axis 50 corresponding to the known agents 20, and a manageable entity axis 54 corresponding to the known manageable entities 24. For example, the manageable entity ME4 (24-4) may be managed by either of agents A2 or A4, as shown by associations 48E and 48F. The actual assignments of management responsibility occurs as a selection of a primary agent 20 for each manageable entity 24 from among the available associations 42, described further below.

Figure 5:
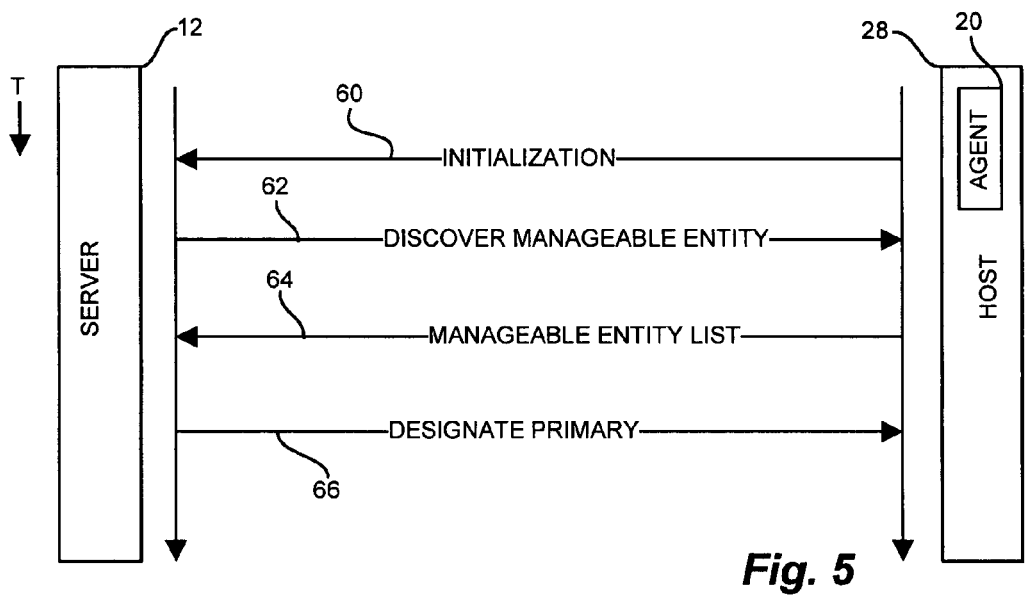
FIG. 5 is a message sequence illustrating the messages employed in FIG. 3.

FIG. 5 is a message timing sequence illustrating the messages employed in FIG. 3. Referring to FIG. 5, the management server 12 and each of the agents 20 engage in a series of messages for assigning management responsibility. Referring to FIGS. 3 and 5, upon startup, each agent 24 sends, via the host 28 upon which it executes, an initialization message 60 to the management server 12 to indicate the type of manageable entity (i.e. Symmetrix, Celerra, switch, etc.) it is equipped to manage. The management server 12 responds with a discover manageable entity message 62 to tell the agent what manageable entities 24 of the corresponding type are in the storage area network 10.

The agent 24 attempts to connect to the manageable entities 24 specified in the discover manageable entity 62 message. Depending on the type of manageable entity 24, the agent 20 may also perform other discovery, such as device parameters, to gather additional information. The agent 24 responds with a manageable entity list message 64, based on the outcome of the connection attempts, to inform the management server 12 which manageable entities 24 it may manage. The management server 12 then computes the management correlation 48, as described above, and computes the management assignments from the available associations 42.

For each manageable entity 24, the management server 12 sends a designate primary message 66 to indicate to the agent 20 that it is responsible to manage the entity 24. Note that the management server 12 sends only one designate primary message 66 on behalf of each manageable entity 24, even if multiple candidate agents 20 are available, since each manageable entity 24 has only one agent 20 with management responsibility.

Figure 6:
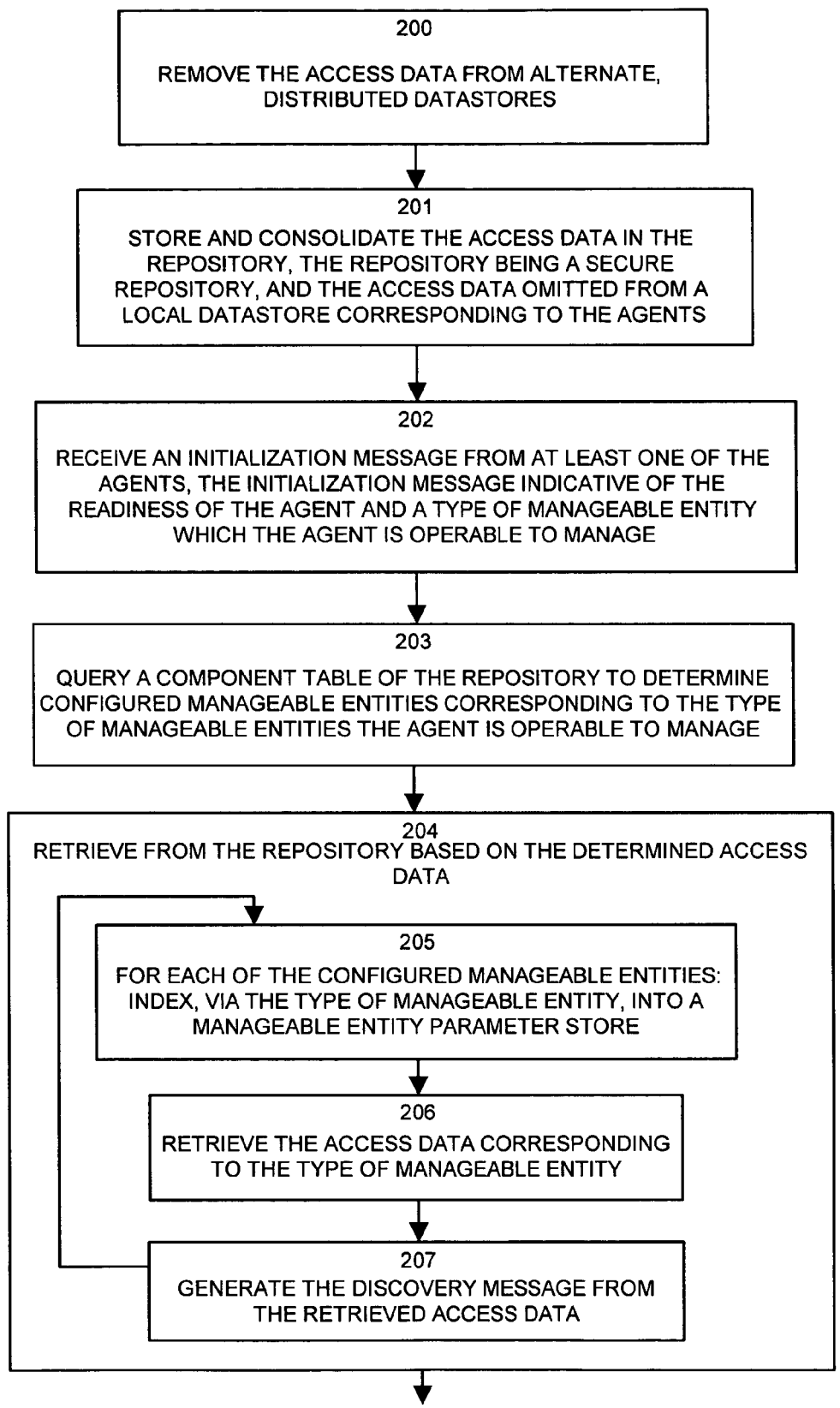
FIGS. 6, 7 and 8 are a flowchart of assigning management responsibility of managed entities in the storage area network of FIG. 3 in greater detail.
Figure 7:
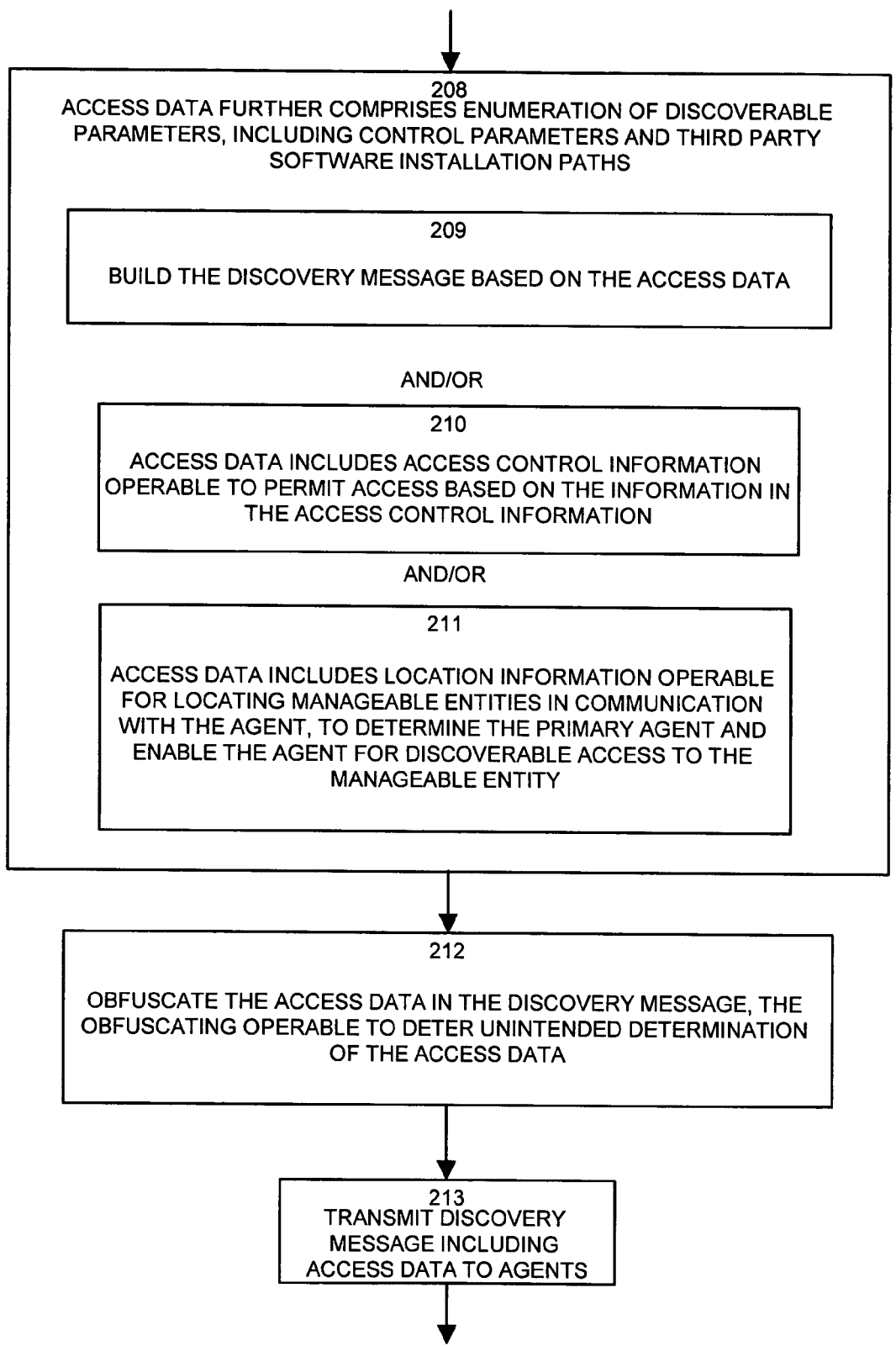
Figure 8:
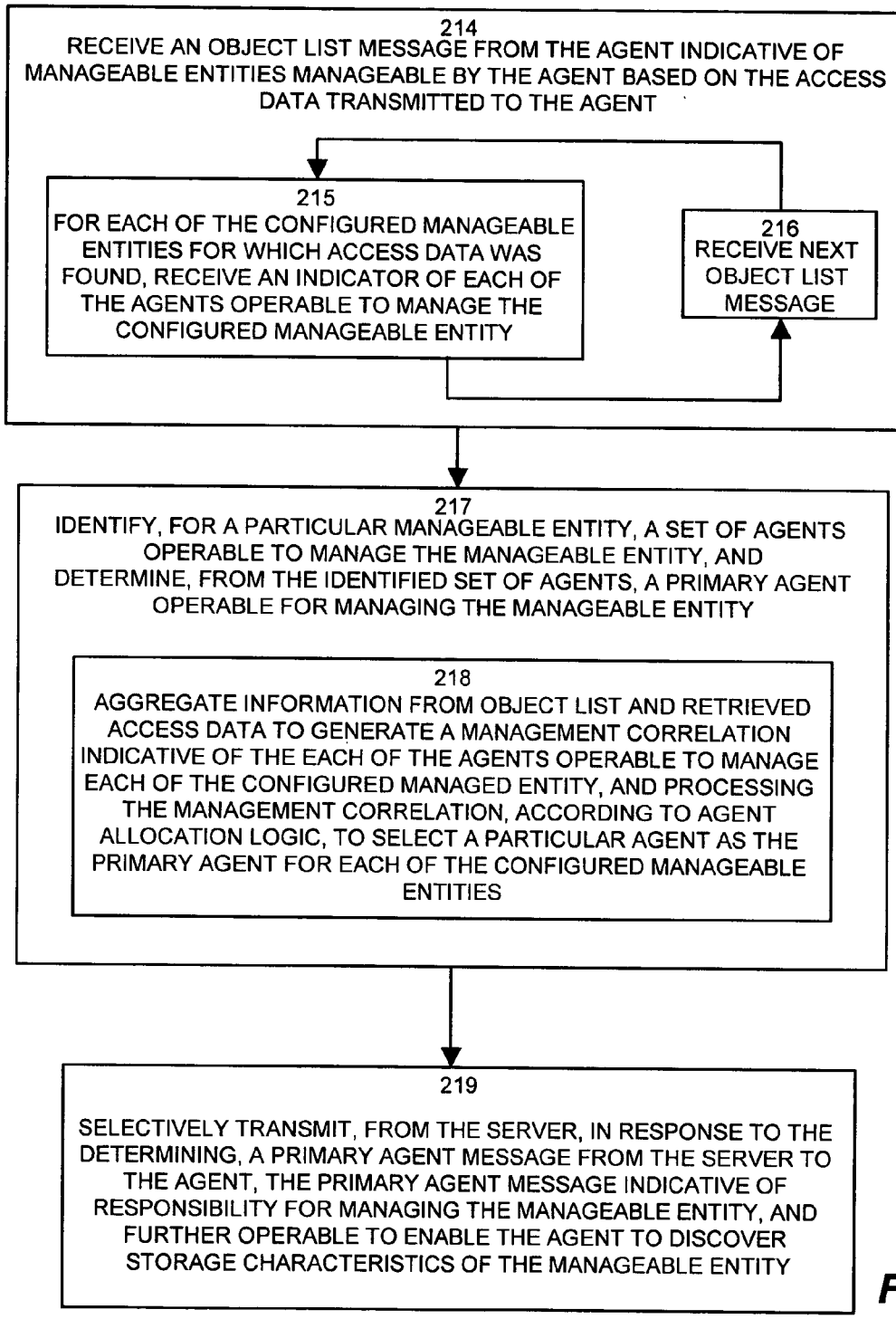

FIGS. 6, 7 and 8 are a flowchart of assigning management responsibility of managed entities in the storage area network of FIG. 3 in greater detail. Referring to FIGS. 3-8, upon startup, the management server 12 references the repository 16 to obtain the access data 18 which previously resided in distributed locations. Accordingly, at step 200, an operator or manager transitions the access data 18 into the repository by removing the access data from the alternate, distributed datastores for consolidating the access data in the repository. This transitioning removes sensitive access data such as passwords and node addresses from local storage at or near the agents, and consolidates the data in the secure repository 16 where the server or other monitor controls access. At step 201, therefore, the access data populates the secure repository 16 for use by the management server 12 during startup, and the access data is accordingly omitted from the local datastore at or local to the agents, therefore avoiding widespread dissemination of sensitive access data.

At step 202, before retrieving the access data 18, the management server 12 receives an initialization message 60 from each of the agents 20 operable for assisted discovery as described herein. The initialization message 60 indicates to the management server 12 the readiness of the agent 20 and the type of manageable entity 24 which the agent 20 may manage. As indicated above, each agent 20 is typically enabled to manage a particular type of manageable entity 24, such as a Symmetrix or Celerra storage element, a switch element, or a database element. The readiness of the agent indicates if the agent 20 is enabled to perform and participate in the Assisted Discovery for Agents (ADA) mechanism as defined herein.

The management server 12 does not require that all agents 20 receive the appropriate access data 18 from the repository 16 as defined herein. Other, non-ADA enabled 20 agents may receive access data from other sources, such as the .ini files described above. In this manner, a management server 12 may support a mix of non-ADA and ADA enabled agents 20 as described herein.

At step 203, the access data manager 32 of the management server 12 uses the component table 38 entries to query the access control table 40. At step 204, retrieving from the repository 16 further includes querying the table 38 in the repository 16 to determine access data corresponding to the type of manageable entities 24 the agent 20 is operable to manage. The component table lists, for each type of manageable entity 24, the manageable entities 24 configured (included) in the storage area network 10 of that type.

At step 205, for each of the configured manageable entities 24, the access data manager 32 indexes into the access table 40 based on the type of manageable entity 24. For each manageable entity 24, the access data manager 32 indexes the entry in the table 40 to fetch access data parameters such as passwords, network addresses, $3^{rd}$ party software installation paths, and others, attributable to each manageable entity 24.

At step 206, for each manageable entity type, the access data manager 32 retrieves the access data corresponding to each type of manageable entity 24. The access data 18 includes the parameters that the agent 20 uses to attempt initial discovery of the manageable entities 24. This includes, in a particular configuration, at least the password and node address parameters of the access data 18, and may include others.

At step 207, the access data manager 32 generates the discovery message from the access data for each manageable entity 24 entry returned. The access data 18 from the access control table 40 specifies parameters on a per manageable entity 24 granularity, however the management server 12 sends the discovery messages to each agent 20, which is in communication with a plurality of manageable entities 24. Accordingly, the access data manager 32 generates the discovery messages 62 based on each access control table 40 entry (record) returned control then results to step 205 for additional manageable entity types, if appropriate. Therefore, a particular agent 20 receives multiple discovery messages 62, each corresponding to a particular manageable entity 24. It will be apparent to those of skill in the art that the access data manager 32 may, in alternate configurations, process the discovery messages 62 in aggregate to generate a single discovery message 62 for each agent, or other alternate data structures for conveying similar information.

At step 208, in generating the discovery messages 62, the access data manager 32 enumerates the discoverable parameters in the access data table 40 data. Enumeration includes parameters such as password, network address, control parameters, $3^{rd}$ party software installation paths, and others. At step 209, the access data manager and builds the discovery messages based on the access data.

At step 209, the access data manager 32 may compute or determine additional access data for the discovery message 62. At step 210 the access data includes access control information operable to permit or deny access based on the information in the access control information. Access control information includes passwords and other security related aspects such as proxy logins (another form of password), authentication indicators (keys), login time windows, privilege settings, and other "fine-tuning" of access.

At step 211, the access data includes location information operable for locating manageable entities in communication with the agent, i.e. manageable entities 24 that are both visible to and of the type the agent 20 is equipped to manage. The server 24 will use such information by invoking the primary determiner 34 to determine the primary agent, described further below. Following determination of the primary agent 20, the management server 12 enables the primary agent 20 for additional discoverable access to the manageable entity 24, for example, full login access rather than merely access to the information to indicate which types of manageable entities 24 the agent may manage.

At step 212, prior to sending the discovery message 62, the management server 12 obfuscates or otherwise transforms the access data in the discovery message 62 to deter unintended determination of the access data. Obfuscation includes security measures such as authentication, encryption, and digests operable to ensure the integrity and authenticity of the data.

At step 213, the management server 12 sends the discovery 62 message to each of the agents 20, and awaits a responsive manageable entity list message 64. At step 214, the management server 12 receives the manageable entity list message 64 from the agents 24 in response to the access data 18 sent to the agent 20. At step 214 manageable entity list message 64 includes a list of manageable entities 24 which are manageable by the agent 20, which include at least those of the corresponding type and coupled to the management server 12 via the storage area network interconnect 22. At step 215, the server also extracts an indicator of each of the agents operable to manage a particular manageable entity. In a particular configuration the indicator is a canonical name by which the management server 12 references the agent 20 via the storage area network 22. In other configurations, the indicator is alternate unique token corresponding to a particular manageable entity 24. The management server 12 iterates, at step 216, for each manageable entity list message 64 from available agents 20.

At step 217, the management server 12 assigns agents 20 to manageable entities 24 by identifying a set of agents 20 for each manageable entity 24, operable to manage the manageable entity 24, and determines a primary agent 20 operable for managing the manageable entity from the set of agents. At step 218, assigning the management responsibility from the set includes aggregating information from the object lists messages 54 sent by the agents 24 and the access data form the repository 16 to generate a management correlation 48 indicative of the each of the agents 20 operable to manage each of the configured manageable entity 24. The management correlation 48, as shown in FIG. 4, in a particular configuration, is a matrix of agents 20 and manageable entities 24.

The management server 12 employs a primary determiner 34 having agent allocation logic to process the management correlation 48 to select a particular agent 20 as the primary agent 20 for each of the configured manageable entities 24. The primary determiner 34, therefore, traverses the management correlation 48 and, for each row representing a manageable entity 24, scans the row to find columns having candidate agents 20. The primary determiner 34 then selects an agent 20 as the primary. Selection may be performed in a variety of methods, such as first available, or via additional variables encompassing load balancing, traffic volume anticipation, and computing power (e.g. processor speed of an agent).

At step 219, the management server 12, having processed the management correlation 48, selectively transmits a designate primary agent message 66 to the agent to indicate responsibility for managing selected manageable entity 24 in response to the primary determiner 34. The primary agent message 66 also enables the agent 20 to discover additional parameters such as storage characteristics of the manageable entity 24. The initial discovery message 62 may not include all parameters for managing the manageable entity 24, but rather parameters sufficient to allow the agent 20 to generate the manageable entity list message 64. Once the management server 12 determines that a particular agent 20 is the primary agent 24 for a manageable entity 24, the management server 12 allows the primary agent 24 to receive other parameters by permitting full discovery of the manageable entity 24 by the primary agent 24.

Figure 9:
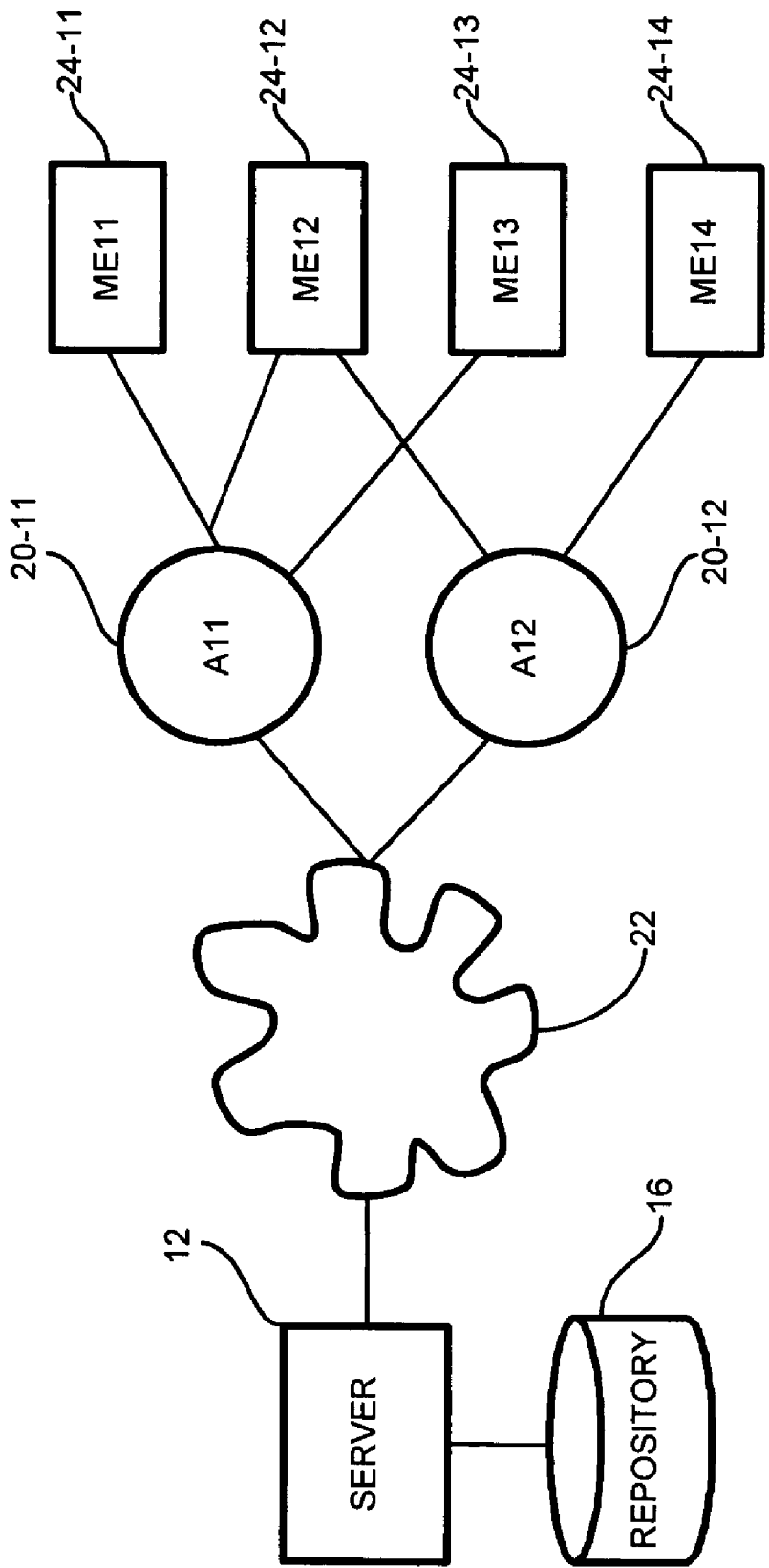
FIG. 9 is an example of assigning management responsibility in a storage area network.

FIG. 9 is an example of assigning management responsibility in a storage area network. Referring to FIG. 9, the exemplary storage area network includes two agents 20-11 and 20-12 and four manageable entities 24-11, 24-12, 24-13, and 24-14. The storage area network interconnections 42 illustrate the connectivity relations between the agents 20 and manageable entities 24. As shown by the interconnections 42, agent 20-11 may manage entities 24-11, 24-12, and 24-13. Agent 20-12 may manage entities 24-12 and 24-14.

Figure 10:
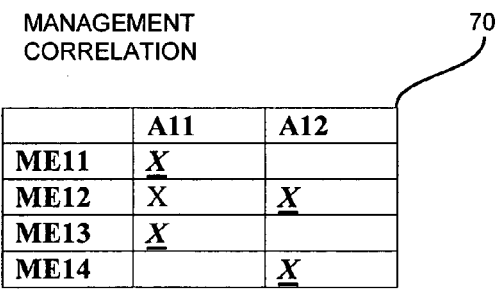
FIG. 10 is a management correlation for the assigning of FIG. 9.

FIG. 10 is a management correlation 70 for the assignment example of FIG. 9. Referring to FIGS. 9 and 10, the management correlation 70 illustrates the relations 42 between the agents 20 and the entities 24 which they may manage. The resulting primary agents 24 for a particular agent appear as an X. Note that while agent 24 A11 is operable to manage three entities (ME11, ME12, and ME13), to do so would imbalance the load such that A12 manages only ME14. Accordingly, the primary determiner 34 selects agent A12 to manage ME12, along with ME14, therefore balancing the management responsibility with agent A11 as primary agent for ME11 and ME13.

Figure 11:
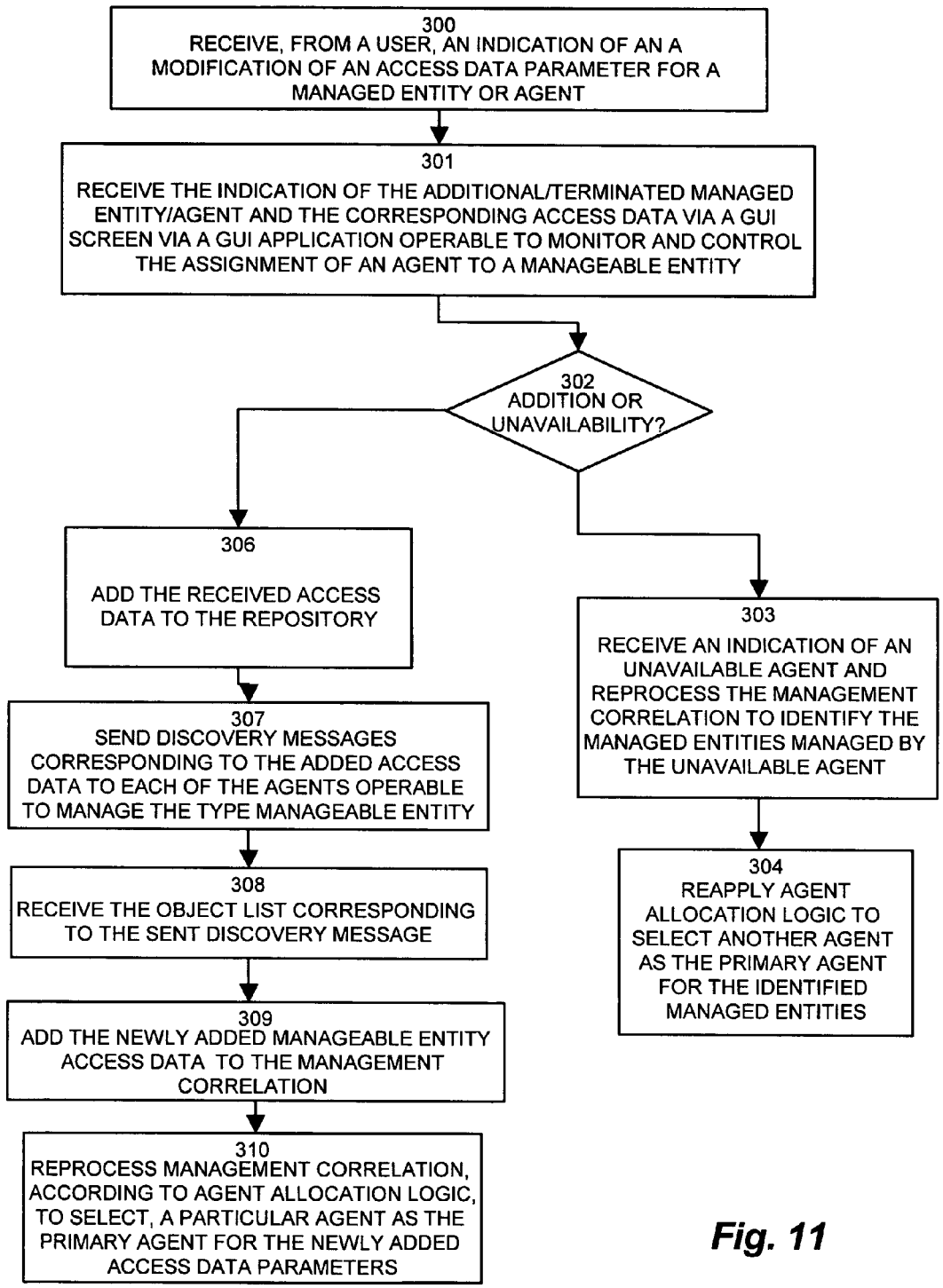
FIG. 11 is a flowchart of reassigning management responsibility in the storage area network of FIG. 3

FIG. 11 is a flowchart of reassigning management responsibility in the storage area network of FIG. 3. Reassignment of management responsibility occurs due to a dynamic network change in the storage area network 10, such as failure of a particular agent 20 or an addition of a manageable entity 24, for example.

The assignment of a primary agent 20 to manage a manageable entity 24 occurs at various times in the storage area network 10. During a system restart, when access data 18 exists in the repository 16, the management server 12 determines the primary responsibility (i.e. which agent 20) for all known manageable entities 24 using information concerning all known agents 20, as described above with respect to FIGS. 6-8. Dynamic, runtime modifications to the primary assignments also occur. Further, upon initial system delivery, no access data 18 exists (i.e. the system has no manageable entities to discover), thus triggering an addition of a manageable entity 24 and entry of corresponding access data.

Referring to FIG. 11, at step 300, the management server 12 receives the indication of the addition or deletion of access data corresponding to a managed entity 24 or agent 20. The indication may be automatic, via a monitor daemon, as in the case of unexpected agent 20 failure, or manual, as in the case of addition of a managed entity 24.

At step 301, the server receives the indication and related data, such as corresponding access data, via a GUI screen driven by a GUI manager application 30 at the console 14. The management server 12 is responsive to the GUI manager 30 for such interactive events to monitor and control the assignment of an agent 20 to a manageable entity 24. Typically addition and deletion of agents 20 and manageable entities 24 involves additional access data via interactive input from a user or operator through the GUI manager 30. However, events such as agent 20 or manageable entity 24 failure may trigger indications locally in the management server 12 without interactive activity. In either case, however, the management server 12 receives an indication of a dynamic change event and the need to integrate additional access data.

At step 302, the management server 12 determines if there is an addition or unavailability event. Depending on the type of event and the affected node (i.e. agent or manageable entity) different processing may result. If there is failure of an agent 20, then at step 303, the primary determiner 34 reprocesses the management correlation to identify the manageable entities managed by the unavailable agent 20. As illustrated above, the primary determiner 34 traverses the management correlation 70 to determine affected managed entities.

At step 304, using the management correlation 70, the primary determiner 34 reapplies the agent allocation logic to select another agent 20 as the primary agent 20 for the identified manageable entities 24 formerly corresponding to the failing agent 20.

On the other hand, if the check at step 302 indicates an addition of a manageable entity 24, than at step 306, the access data manager 32 adds the access data corresponding to the modification to the repository 16. At step 307, the access data manager 32 sends discovery messages 62 corresponding to the added manageable entity 24 to each of the agents 20 operable to manage the type of manageable entity 24 affected by the modification. The discovery message 62 is similar to the startup sequence, except that the manageable entities 24 already running need not participate.

At step 308, the management server 12 receives the manageable entity list message 64 corresponding to the sent discovery message 62, and at step 309, the access data manager 32 adds the newly added access data and related information to the management correlation 70, as appropriate. At step 310, the primary determiner 34 reprocesses the management correlation 70, according to agent allocation logic, described above, to select a particular agent 20 as the primary agent for the newly added manageable entity 24.

Figure 12:
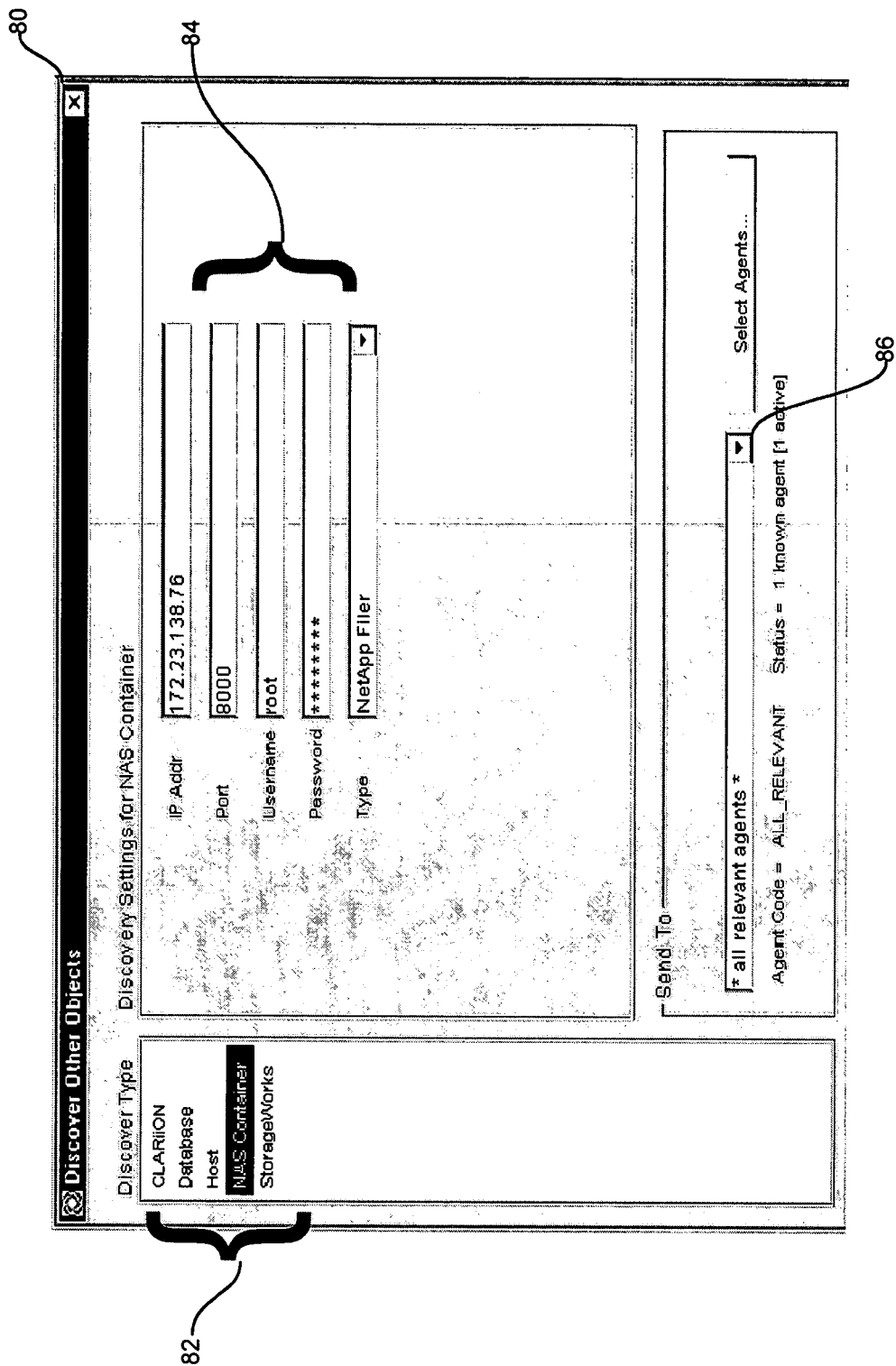
FIG. 12 is an example of a GUI screen for populating the repository with the discoverable access data in the storage area network of FIG. 3.

FIG. 12 is an example of a GUI screen for populating the repository 16 with the discoverable access data 18 in the storage area network 10 of FIG. 3 or adding or modifying a manageable entity 24 as in FIG. 11. Referring to FIG. 12, a parameter screen 80 for a manageable entity 24 is shown. The parameter screen 80 includes an entity type window 82 illustrative of the type of manageable entity 24 which the user is adding. A series of parameter pulldowns/entry icons 84 display the corresponding discoverable parameters for the manageable entity 24, such as network address, password, and port, to name several. Other parameters may be applicable to different types of manageable entities 24. A user command icon 86 allows context specific user input. In this example, the icon 86 allows specification/override of agents to which the discovery message 62 is sent. A setting of "All Relevant Agents" involves the management server 12 sending the discovery message 62 to all agents 10 matching the type of the agent being added. Alternatively, the user may enter a specific agent or set of agents 20 in the icon 86. Other parameters and commands, in alternate arrangements, may also be specified.

Figure 13:
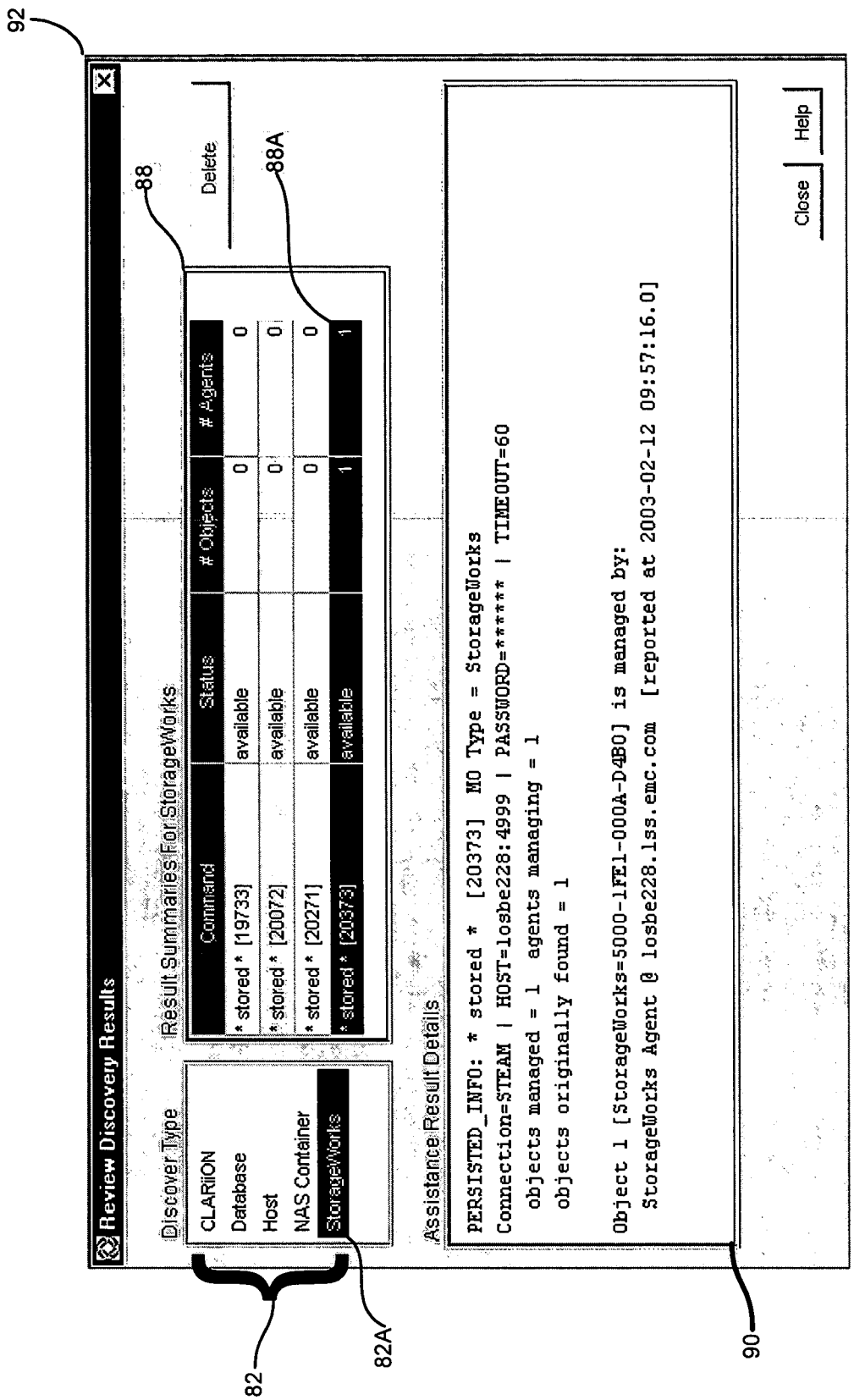
FIG. 13 is an example of a GUI screen identifying access data stored in the repository in the storage area network of FIG. 3.

FIG. 13 is an example of a GUI screen identifying access data 18 stored in the repository 16 in the storage area network 10 of FIG. 3. Referring to FIG. 13, an interactive (GUI) user information screen 86 92 displays information corresponding to the management correlation 48, 70 is shown. The GUI screen 92 includes the entity type window 82, an agent summary 88, and a results detail window 90. Note that, in a particular implementation, each agent 20 manages a particular type of manageable entity 24, therefore the entity type window 82 is equally applicable to a manageable entity 24 or the corresponding agent 20.

In the example shown, agents 24 for managing "storageworks" 82A manageable entity 24 types are shown in the agent summary window 88. A highlighted agent 88A, having an identifier of [20373], is shown in further detail in the detail window 90. The agent [20373] manages a storageworks manageable entity (i.e. Object 1) having a network address (media access control, or MAC) of 5000-1FE1-000A-D4B0. Alternate and additional status information is shown in other screens.

Those skilled in the art should readily appreciate that the programs for assigning management responsibilities for storage area network entities as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for assigning management responsibilities for storage area network entities has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for assigning management responsibility to agents for management of manageable entities comprising:
retrieving access data from a repository, the access data enabling an agent to gain management access to at least one manageable entity;
transmitting a discovery message to an agent, the discovery message including the access data corresponding to manageable entities accessible by the agent according to a type of the manageable entity; and
receiving, from the agent, a manageable entity list message indicative of manageable entities manageable by the agent based on the access data transmitted to the agent, the manageable entity list message operable for determining assignment of management responsibility to the agent for at least one manageable entity of the manageable entities indicated in the manageable entity list message, further comprising:

receiving, from a user, an indication of a new access data parameter for a manageable entity type;

adding the received access data to the repository;

sending discover messages corresponding to the access data to each of the agents operable to manage the type of manageable entity corresponding to the added access data parameter; and receiving the manageable entity list corresponding to the sent discovery message, the manageable entity list operable to enable adding the newly added manageable entity to a management correlation, and further operable to enable reprocessing the management correlation, according to agent allocation logic, to select a particular agent as the primary agent for the newly added manageable entities.

2. The method of claim 1 further comprising building the discovery message based on the access data.

3. The method of claim 1 wherein the access data includes access control information operable to permit access based on the information in the access control information.

4. The method of claim 1 wherein the access data includes location information operable for locating manageable entities of a storage area network in communication with the agent, and the determining a primary agent for undertaking the management responsibility further comprises enabling the agent for discoverable access to the manageable entity.

5. The method of claim 1 further comprising encrypting the access data in the discovery message, the encrypting operable to deter unintended determination of the access data.

6. The method of claim 1 further comprising, prior to retrieving the access data, receiving an initialization message from at least one of the agents, the initialization message indicative of the readiness of the agent and a type of manageable entity which the agent is operable to manage.

7. The method of claim 1 wherein the access data further comprises enumeration of discoverable parameters, including at least one of passwords, network address, control parameters and $3^{rd}$ party software installation paths.

8. The method of claim 1 wherein retrieving from the repository further comprises querying a component table of the repository to determine access data corresponding to the type of manageable entities the agent is operable to manage.

9. The method of claim 8 wherein retrieving from the repository further comprises, based on the determined access data, for each of the type of configured manageable entities:

indexing, via the type of the configured manageable entity, into a manageable entity parameter store;

retrieving the access data corresponding to the type of manageable entity; and generating the discovery message from the retrieved access data.

10. The method of claim 1 wherein the manageable entity list message further comprises, for each of the configured types of manageable entities for which access data was found:

an indicator of each of the agents operable to manage the configured manageable entity type.

11. The method of claim 1 wherein storing the access data in the repository further comprises removing the access data from alternate, distributed datastores and consolidating the access data in the repository.

12. The method of claim 1 further comprising receiving the indication of the additional access data via a GUI screen via a GUI application operable to monitor and control the assignment of an agent to a manageable entity.

13. The method of claim 1 further comprising: prior to retrieving the access data, storing the access data in the repository, the repository being a secure repository, and the access data omitted from persistent storage in a local datastore of a computer system operating the agents.

14. A data communications device for assigning management responsibility to agents for management of manageable entities comprising:

a display;

an access data manager in a server for retrieving access data from a repository, the access data enabling an agent to gain management access to at least one manageable entity, the access data manager for transmitting a discovery message to an agent, the discovery message including the access data corresponding to manageable entities accessible by the agent according to a type of the entity, the agent responsive to the discovery message for generating a manageable entity list message indicative of manageable entities manageable by the agent based on the access data transmitted to the agent, the manageable entity list message further enabling assignment of management responsibility to the agent for at least one manageable entity of the manageable entities indicated in the manageable entity list message the access data manager further operable to:

receive, from a user, an indication of an additional access data parameter for a manageable entity type;

add the received access data to the repository;

send discovery messages corresponding to the additional access data to each of the agents operable to manage the type of manageable entity corresponding to the additional access data; and receive the manageable entity list corresponding to the sent discovery message, the manageable entity list operable for enabling addition of the newly added access data to a management correlation indicative of each of the agents operable to manage each of the types of configured manageable entities, and further operable for enabling reprocessing of the management correlation, according to agent allocation logic, to select a particular agent as the primary agent based on the additional access data.

15. The data communications device of claim 14 wherein the server is further operable to:

identify, for a particular manageable entity, a set of agents operable to manage the manageable entity; and determine, from the identified set of agents, a primary agent operable for managing the manageable entity.

16. The data communications device of claim 15 wherein the server is operable to selectively transmit a designate primary agent message from the server to the agent, the primary agent message indicative of responsibility for managing the manageable entity, and further operable to enable the agent to discover storage characteristics of the manageable entity.

17. The data communications device of claim 14 wherein the access data manager is further operable to, prior to retrieving the access data, store the access data in the repository, the repository being a secure repository, and the access data omitted from a local datastore corresponding to the agents.

18. The data communications device of claim 14 wherein the access data manager is further operable to build the discovery message based on the access data.

19. The data communications device of claim 14 wherein the access data includes access control information operable to permit access based on the information in the access control information.

20. The data communications device of claim 14 wherein the access data includes identification information operable for identifying manageable entities in communication with the agent, the access data further operable to enable the agent for discoverable access to the manageable entity.

21. The data communications device of claim 14 further comprising encrypting the access data in the discovery message, the encrypting operable to deter unintended determination of the access data.

22. The data communications device of claim 14 wherein the access data manager is operable to, prior to retrieving the access data, receive an initialization message from at least one of the agents, the initialization message indicative of the readiness of the agent and a type of manageable entity which the agent is operable to manage.

23. The data communications device of claim 14 wherein the access data further comprises enumeration of discoverable parameters, including at least one of passwords, network address, control parameters and $3^{rd}$ party software installation paths.

24. The data communications device of claim 14 wherein the access data manager is further operable to, prior to retrieving the access data, query a component table of the repository to determine the type of manageable entities the agent is operable to manage.

25. The data communications device of claim 14 wherein the manageable entity list message further comprises, for each of the configured manageable entities for which access data was found:
   an indicator of access data operable to enable management contact with the configured manageable entity.

26. The data communications device of claim 14 further comprising a Graphical User Interface (GUI) application for receiving the indication of the additional access data, the GUI application operable via a GUI screen to monitor and control the assignment of an agent to a manageable entity.

27. The method of claim 14 wherein the access data manager is further operable to:
   index, via the type of the manageable entity, into a manageable entity type parameter store;
   retrieve the access data corresponding to the type of manageable entity; and
generate the discovery message from the retrieved access data.

28. A computerized device comprising:
   a display;
   a memory system;
   a processor; and
   an interconnection mechanism connecting the display, the processor and the memory system;
   wherein the memory system is encoded with a control center application that when performed on the processor, produces at least one control center process that provides a graphical user interface produced on the display of the computerized device, the graphical user interface allowing a user of the computerized device to monitor and control assigning management responsibility to agents for management of manageable entities in a network, the control center processes performing operations comprising:
      retrieving access data from a repository, the access data enabling an agent to gain management access to at least one manageable entity;
      transmitting a discovery message to an agent, the discovery message including the access data corresponding to types of manageable entities accessible by the agent;
      receiving, from the agent, a manageable entity list message indicative of manageable entities manageable by the agent based on the access data transmitted to the agent, the manageable entity list message operable for determining assignment of management responsibility to the agent for at least one manageable entity of the manageable entities indicated in the manageable entity list message, retrieving from the repository further comprising, based on the determined access data, for each of the type of configured manageable entities:
         indexing, via the type of the configured manageable entity, into a manageable entity parameter store;
         retrieving the access data corresponding to the type of manageable entity; and
      generating the discovery message from the retrieved access data, further comprising:
         receiving, from a user, indication of a new access data parameter for a manageable entity type;
         adding the received access data to the repository;
         sending discovery messages corresponding to the access data to each of the agents operable to manage the type of manageable entity corresponding to the added access data parameter; and
         receiving the manageable entity list corresponding to the sent discovery message, the manageable entity list operable to enable adding the newly added manageable entity to a management correlation, and further operable to enable reprocessing the management correlation, according to agent allocation logic, to select a particular agent as the primary agent for the newly added manageable entities.

29. A data communications device for assigning management responsibility to agents for management of manageable entities comprising:
   means for displaying;
   means for retrieving access data from a repository, the access data enabling an agent to gain management access to at least one manageable entity;
   means for, prior to retrieving the access data, storing the access data in the repository, the repository being a secure repository, and the access data omitted from persistent storage in a local datastore of a computer system operating the agents;
means for transmitting a discovery message to an agent, the discovery message including the access data corresponding to types of manageable entities accessible by the agent;
   means for receiving, from the agent, a manageable entity list message indicative of manageable entities manageable by the agent based on the access data transmitted to the agent, and the manageable entity list message operable for determining assignment of management responsibility to the agent for at least one manageable entity of the manageable entities indicated in the manageable entity list message, retrieving from the repository further comprising, based on the determined access data, for each of the type of configured manageable entities:
      indexing, via the type of the configured manageable entity, into a manageable entity parameter store;
      retrieving the access data corresponding to the type of manageable entity; and
      generating the discovery message from the retrieved access data, further comprising:
      means for receiving, from a user, an indication of a new access data parameter for a manageable entity type;
      means for adding the received access data to the repository;
      means for sending discovery messages corresponding to the access data to each of the agents operable to manage the type of manageable entity corresponding to the added access data parameters; and means for receiving the manageable entity list corresponding to the sent discovery message, the manageable entity list operable to enable adding the newly added manageable entity to a management correlation, and further operable to enable reprocessing the management correlation, according to agent allocation logic, to select a particular agent as the primary agent for the newly added manageable entities.

30. A method for assigning management responsibility to agents in a storage area network for management of manageable entities, the manageable entities including storage objects, network objects, and database objects comprising:

identifying security sensitive access data stored in distributed local storage at manageable entities in the storage area network;

moving the access data from the distributed local storage to a common repository having controlled access via a control center application;

receiving, from the agents, an indicator of a type of manageable entities operable for management by each of the agents;

identifying, via the control center application and the repository, a set of manageable entity types operable to be managed by that a gent type;

retrieving, via an access data manager in the control center application, the access data from the repository corresponding to the type of manageable entities, the access data enabling an agent to gain management access to at least one manageable entity;

prior to retrieving the access data, storing the access data in the repository, the repository being a secure repository, and the access data omitted from persistent storage in a local datastore of a computer system operating the agents;

transmitting a discovery message to an agent, the discovery message including the access data corresponding to the types of manageable entities accessible by the agent;

receiving, from each of the agents responsive to the discovery message, a manageable entity list message indicative of manageable entities coupled to the agent and manageable by the agent based on the access data transmitted to the agent, a plurality of the manageable entity list messages further operable in aggregate for generating a management correlation indicative of a set of agents operable to mange each of the identified manageable entities, the management correlation for enabling, based on the generated management correlation and agent allocation logic operable to optimize allocation of agents, assignment of management responsibility to each of the agents for at least one manageable entity of the manageable entities indicated in the plurality of manageable entity list messages, further comprising:

receiving, from a user, and indication of a new access data parameter for a manageable entity type;

adding the received access data to the repository;

sending discovery messages corresponding to the access data to each of the agents operable to manage the type of manageable entity corresponding to the added access data parameters; and receiving the manageable entity list corresponding to the sent discover message, the manageable entity list operable to enable adding the newly added manageable entity to the management correlation, and further operable to enable reprocessing the management correlation, according to agent allocation logic, to select a particular agent as the primary agent for the newly added manageable entities.

* * * * *